(12) United States Patent
Chen et al.

(10) Patent No.: US 10,727,974 B2
(45) Date of Patent: Jul. 28, 2020

(54) APERIODIC CHANNEL QUALITY INDICATOR REPORT IN CARRIER AGGREGATION

(71) Applicant: QUALCOMM Incorporated, San Diego, CA (US)

(72) Inventors: Wanshi Chen, San Diego, CA (US); Jelena M. Damnjanovic, Del Mar, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/448,795

(22) Filed: Jun. 21, 2019

(65) Prior Publication Data

US 2019/0312670 A1 Oct. 10, 2019

Related U.S. Application Data

(63) Continuation of application No. 13/208,080, filed on Aug. 11, 2011, now Pat. No. 10,333,650.

(Continued)

(51) Int. Cl.
*H04L 1/00* (2006.01)
*H04L 5/00* (2006.01)
*H04W 24/10* (2009.01)

(52) U.S. Cl.
CPC ............ *H04L 1/0027* (2013.01); *H04L 5/001* (2013.01); *H04L 5/0053* (2013.01); *H04L 5/0057* (2013.01); *H04W 24/10* (2013.01)

(58) Field of Classification Search
CPC ..... H04L 1/0027; H04L 5/001; H04L 5/0053; H04L 5/0057; H04L 1/0026;
(Continued)

(56) References Cited

U.S. PATENT DOCUMENTS 1,033,365 A1 6/2019 Chen et al.
2006/0250938 A1 11/2006 Khan et al.
(Continued)

FOREIGN PATENT DOCUMENTS

CN 101615984 A 12/2009
CN 101702632 A 5/2010
(Continued)

OTHER PUBLICATIONS

Texas Instruments: "UCI Transmission on PUSCH for Carrier Aggregation", 3GPP Draft; R1-103694 TI UCITransmission on PUSCH for Carrier Aggregation_V5, 3rd Generation Partnership Project (3GPP), Mobile Competence Centre ; 650, Route Des Lucioles ; F-06921 Sophia-Antipolis Cedex; France, vol. RAN WG1, No. Dresden, Ge.*

(Continued)

*Primary Examiner* — Hardikkumar D Patel
(74) *Attorney, Agent, or Firm* — Steven A. Raney

(57) ABSTRACT

Techniques for reporting channel quality information (CQI) in a multi-carrier wireless communication system are disclosed. In one aspect, a user equipment determines one or more reporting groups, each comprising a plurality of component carriers which are configured for the user equipment. The user equipment may detect a trigger from a base station that selects a reporting group and may respond to the trigger by sending CQI for at least the activated component carriers in the selected reporting group.

30 Claims, 9 Drawing Sheets

Related U.S. Application Data

(60) Provisional application No. 61/374,069, filed on Aug. 16, 2010.

(58) Field of Classification Search
CPC ....... H04L 1/0028; H04L 1/06; H04L 5/0007; H04L 5/0096; H04L 5/0098; H04L 5/0037; H04L 5/0094; H04L 27/2601; H04L 12/26; H04L 43/50; H04L 5/003; H04L 25/03343; H04L 2025/03414; H04L 2025/03426; H04L 2025/03802; H04L 5/023; H04L 12/28; H04W 24/10; H04W 72/04; H04W 72/1226; H04W 36/0072; H04W 88/08; H04W 84/12; H04J 11/0093; H04B 7/024; H04B 7/0417; H04B 7/0632; H04B 7/0478; H04B 7/0434; H04B 7/0452; H04B 7/063; H04B 7/0634; H04B 7/0639; H04B 1/38; H04B 7/0697; H04Q 7/22

See application file for complete search history.

(56) References Cited

U.S. PATENT DOCUMENTS

| | | | |
|---|---|---|---|
| 2010/0238984 A1 | 9/2010 | Sayana et al. | |
| 2011/0143749 A1 | 6/2011 | Guo et al. | |
| 2011/0249656 A1* | 10/2011 | Cai | H04L 1/0028 370/336 |
| 2012/0063401 A1 | 3/2012 | Xue et al. | |
| 2013/0039327 A1 | 2/2013 | Gao et al. | |

FOREIGN PATENT DOCUMENTS

| | | |
|---|---|---|
| WO | WO-2010056763 A2 | 5/2010 |
| WO | WO-2011134174 A1 | 11/2011 |

OTHER PUBLICATIONS

Fujitsu: "Aperiodic CQI reporting for multiple DL component carriers", 3GPP Draft; R1-104044, 3rd Generation Partnership Project (3GPP), Mobile Competence Centre; 650, Route Des Lucioles; F-06921 Sophia-Antipolis Cedex; France, vol. RAN WG1, No. Dresden, Germany; Jun. 28, 2010, Jun. 23, 2010 (Jun. 23, 2010), pp. 1-3, XP050449475, [retrieved on Jun. 23, 2010].

Interdigital et al., "Scheduling and DRX Operation for Carrier Aggregation", 3GPP TSG-RAN WG2 Meeting #68, R2-096583, Nov. 2009, pp. 1-3, http://www.3gpp.org/ftp/tsg_ran/WG2_RL2/TSGR2_68/Docs/R2-096583.zip.

International Search Report and Written Opinion—PCT/US2011/047569—ISA/EPO—dated Oct. 21, 2011.

Qualcomm Incorporated: "CQI for CA", 3GPP Draft; R1-103537 CQI for CA, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; Jun. 28, 2010, Jun. 22, 2010 (Jun. 22, 2010), XP050449044, [retrieved on Jun. 22, 2010].

Panasonic: "Linkage between PDSCH/PUSCH CC and PDCCH CC for cross carrier scheduling", 3GPP TSG-RAN WG1 Meeting #60bis, R1-102015, Apr. 16, 2010, http://www.3gpp.org/ftp/tsg_ran/wg1_rl1/TSGR1_60b/Docs/R1-102015.zip, pp. 1-3.

Qualcomm Europe: "CQI Feedback for Multicarrier Operation", 3GPP Draft; R1-094207 COI For MC, 3rd Generation Partnership Project (3GPP), Mobile Competence Centre ; 650, Route Des Lucioles ; F-06921 Sophia-Antipolis Cedex; France, No. Miyazaki; Oct. 12, 2009, Oct. 12, 2009 (Oct. 12, 2009), XP050388677.

* cited by examiner

APERIODIC CHANNEL QUALITY INDICATOR REPORT IN CARRIER AGGREGATION

CROSS REFERENCE TO RELATED APPLICATIONS

This application claims the benefit of U.S. patent application Ser. No. 13/208,080 entitled "Aperiodic Channel Quality Indicator Report in Carrier Aggregation" filed Aug. 11, 2011, and U.S. Provisional Patent Application No. 61/374,069 entitled "Aperiodic Channel Quality Indicator Report in Carrier Aggregation" filed Aug. 16, 2010, which are expressly incorporated by reference herein in their entirety.

TECHNICAL FIELD

The present disclosure relates generally to the field of wireless communications and, more particularly, to methods, apparatus and articles of manufacture for reporting channel quality in wireless communication systems with aggregated carriers.

BACKGROUND

This section is intended to provide a background or context to the disclosed embodiments. The description herein may include concepts that could be pursued, but are not necessarily ones that have been previously conceived of or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

In some wireless communication systems, a mobile device may report information about channel conditions to a base station. This information may include, for example, an operating signal-to-noise ratio. The base station may use the information about channel conditions to make proper decisions regarding scheduling, MIMO settings, modulation and coding choices, etc.

SUMMARY

Techniques for reporting channel quality indicators (CQIs) in a multi-carrier wireless communication system are disclosed. In one aspect, a user equipment (UE) determines one or more reporting sets, where each reporting set includes a plurality of component carriers. On a downlink control channel, the UE receives a trigger for transmission of an aperiodic CQI report. On an uplink data channel corresponding to the downlink control channel, the UE transmits the aperiodic CQI report for component carriers in a reporting set selected by the trigger.

In one aspect, the UE determines which component carriers in the selected reporting set are activated component carriers, and generates the aperiodic CQI report for the activated component carriers. In another aspect, the UE determines which component carriers in the selected reporting set are deactivated component carriers, and generates dummy CQI feedback for each of the deactivated component carriers in the form of a predetermined pattern. In other aspects, the UE determines the reporting sets by receiving radio resource control (RRC) configuration messages and/or each of the one or more reporting sets includes a primary component carrier (PCC), where the PCC includes the downlink control channel.

In one aspect, a base station signals one or more reporting sets to a user equipment (UE), where each reporting set includes a plurality of component carriers. The base station transmits, on a downlink control channel, a trigger for the transmission of aperiodic channel quality information (CQI) by the UE, wherein the base station receives, on an uplink data channel corresponding to the downlink control channel, an aperiodic CQI report for component carriers in a reporting set selected by the trigger. In one aspect, the base station also transmits one or more different reporting sets to a second UE in communication with the base station.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Provided embodiments are illustrated by way of example, and not of limitation, in the figures of the accompanying drawings in which.

DETAILED DESCRIPTION

Figure 1:
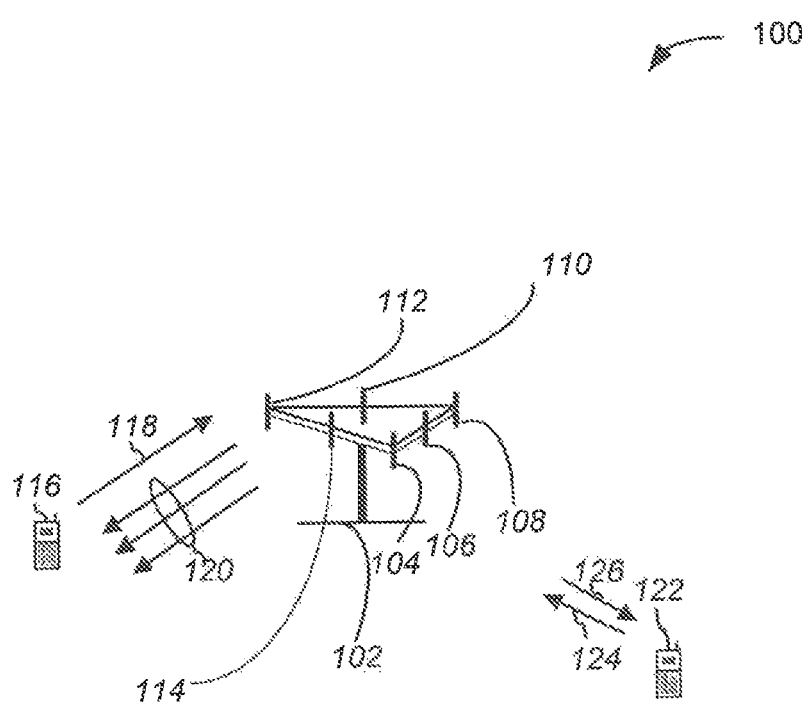
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNodeB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The present disclosure may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 shows a multi-carrier wireless communication system 100. A base station 102 may include multiple antenna groups, and each antenna group may comprise one or more antennas. For example, if the base station 102 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

A first user equipment 116 communicates with, for example, the fifth antenna 112 and the sixth antenna 114 to enable the transmission of information to the first user equipment 116 over a first forward link 120. As shown, the exemplary first forward link 120 comprises three component carriers (CCs) while the exemplary first reverse link 118 includes one component carrier. The number of component carriers in both the forward link 120 and the reverse link 118 may vary over time and is not limited by the present example. For instance, from time to time, base station 102 may configure and reconfigure a plurality of uplink and downlink CCs for the multi-carrier user equipment 116, 122 it serves.

FIG. 1 also illustrates a second user equipment 122 in communication with, for example, the third antenna 108 and the fourth antenna 110 of base station 102 to enable the transmission of information to the second user equipment 122 over a second forward link 126, and the reception of information from the second user equipment 122 over a second reverse link 124. In a Frequency Division Duplex (FDD) system, the component carriers 118, 120, 124 126 shown in FIG. 1 may use different frequencies for communication. For example, the first forward link 120 may use a different frequency than that used by the first reverse link 118.

Each group of antennas and/or the area in which they are designed to communicate may be referred to as a sector of base station 102. For example, the antenna groups depicted in FIG. 1 may be designed to communicate with the user equipment 116, 122 in a different sectors of the base station 102. On the forward links 120 and 126, the transmitting antennas of the base station 102 may utilize beamforming in order to improve the signal-to-noise ratio of the forward links for the different user equipment 116 and 122. Use of beamforming to transmit to user equipment scattered throughout a coverage area may reduce the amount of interference to user equipment in the neighboring cells.

Each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The exemplary multi-carrier communication system 100 may include physical uplink (UL) channels and physical downlink (DL) channels. The downlink physical channels may include at least one of a physical control format indicator channel (PCFICH), a physical downlink control channel (PDCCH), a physical hybrid ARQ indicator channel (PHICH) and a physical downlink shared channel (PDSCH). The uplink physical channels may include at least one of a physical random access channel (PRACH), a channel quality indicator channel (CQICH), a physical uplink control channel (PUCCH) and a physical uplink shared channel (PUSCH).

Further, the following terminology and features may be used in describing the various disclosed embodiments:

3GPP 3rd Generation Partnership Project
AMC Adaptive modulation and coding
ARQ Automatic repeat request
BTS Base transceiver station
CC Component carrier
Co-MIMO Cooperative MIMO
CP Cyclic prefix
CQI Channel quality indicator
CRC Cyclic redundancy check
DCI Downlink control indicator
DFT-SOFDM Discrete Fourier transform spread OFDM
DL Downlink (base station to subscriber transmission)
E-UTRAN Evolved UMTS terrestrial radio access network
eNodeB Evolved Node B
E-UTRA Evolved UTRA
E-UTRAN Evolved UTRAN
FDD Frequency division duplex
HARQ Hybrid automatic repeat request
HSDPA High speed downlink packet access
HSPA High speed packet access
HSUPA High speed uplink packet access
LTE Long term evolution
MAC Medium access control
MIMO Multiple input multiple output
MISO Multiple input single output
MU-MIMO Multiple user MIMO
OFDM Orthogonal frequency division multiplexing
OFDMA Orthogonal frequency division multiple access
PBCH Physical broadcast channel
PCC Primary component carrier
PCFICH Physical control format indicator channel
PDCCH Physical downlink control channel
PDSCH Physical downlink shared channel
PHICH Physical hybrid ARQ indicator channel
PHY Physical layer
PRACH Physical random access channel
PMI Pre-coding matrix indicator
PUCCH Physical uplink control channel
PUSCH Physical uplink shared channel.

Figure 2:
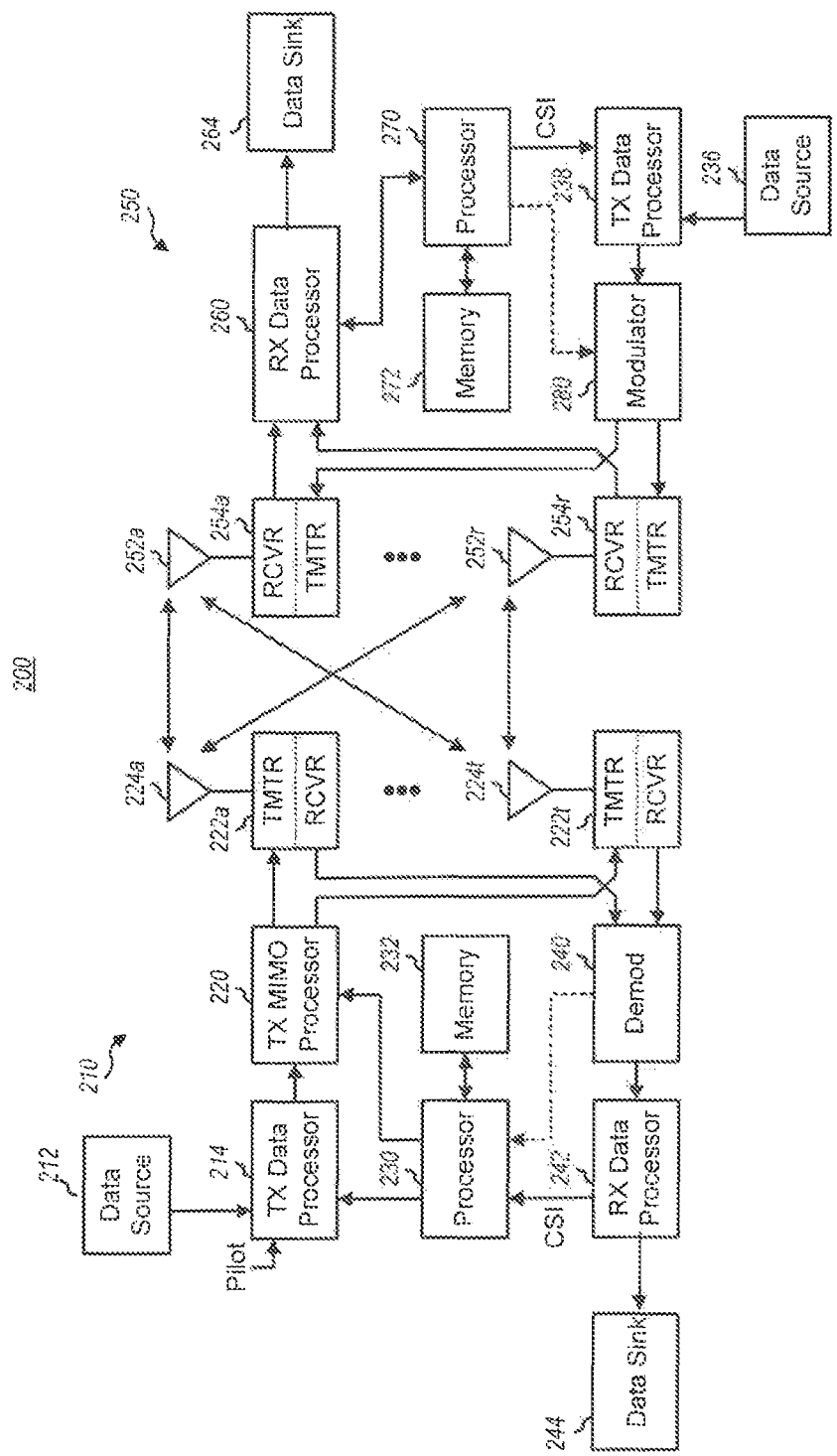
FIG. 2 illustrates a block diagram of a communication system.

FIG. 2 is a block diagram illustrating additional aspects of an exemplary multi-carrier wireless communication system 200 which can be as described in connection with FIG. 1. As shown, system 200 comprises a base station 210 (also referred to as a "transmitter system," "access point," or "eNodeB") and a user equipment 250 (also referred to as a "UE," "receiver system," or "access terminal"). It will be appreciated that even though the base station 210 is referred to as a transmitter system and the user equipment 250 is referred to as a receiver system, as illustrated, these systems communicate bi-directionally. As such, the terms "transmitter system" and "receiver system" are not limited to single direction communications from either system. Further, it should also be noted the base station 210 and the user equipment 250 of FIG. 2 may each communicate with a plurality of other receiver and transmitter systems.

At the base station 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data. The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the base station 210.

In the present example, modulation symbols for all data streams may be provided to a TX MIMO processor 220, which can perform further processing (e.g., for OFDM). The TX MIMO processor 220 may then provide $N_T$ modulation symbol streams to $N_T$ transmitter system transceivers (TMTR) 222a through 222t. The TX MIMO processor 220 may further apply beamforming weights to the symbols of the data streams and to the antenna 224 from which the symbol is transmitted.

Transceiver 222a through 222t at base station 210 receive and process a respective symbol stream to provide one or more analog signals, and further condition the analog signals to provide a modulated signal suitable for transmission. In some systems, the conditioning may include, but is not limited to, operations such as amplification, filtering, up-conversion and the like. The modulated signals produced by the transceivers 222a through 222t are then transmitted from the antennas 224a through 224t of base station 210 as shown in FIG. 2.

At the user equipment 250, the transmitted modulated signals may be received by the antennas 252a through 252r, and the received signal from each of the receiver system antennas 252a through 252r is provided to a respective transceiver (RCVR) 254a through 254r. Each transceiver 254a through 254r at the user equipment 250 may condition a respective received signal, digitize the conditioned signal to provide samples and further processes the samples to provide a corresponding "received" symbol stream. Conditioning may include, but is not limited to, operations such as amplification, filtering, down-conversion and the like.

An RX data processor 260 receives and processes symbol streams from transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 can demodulate, de-interleave and decode each detected symbol stream to recover the traffic data for the corresponding data stream. The processing by the RX data processor 260 may be complementary to that performed by the TX MIMO processor 220 and the TX data processor 214 at the base station 210. The RX data processor 260 can additionally provide processed symbol streams to a data sink 264.

A channel response estimate may be generated by the RX data processor 260 and used to perform space/time processing at the receiver system, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the user equipment can further derive channel state information (CSI) which may include information regarding the communication link and/or the received data stream.

The CSI may include, for example, different types of information about channel conditions. For example, CSI can include a rank indicator (RI) and/or a precoding matrix index (PMI) for determining MIMO parameters, and/or wideband or sub-band channel quality information (CQI) for each CC configured by base station 210 for determining data rates and modulation and coding schemes. Processor 270 can generate CSI reports that include PMI, CQI and/or RI for one or more of the carriers configured for use by user equipment 250.

In particular, the CQI (also referred to as "channel quality index," and "channel quality indicator") may be used by the base station 210 to determine the data rate that can be supported by each of the configured component carriers, taking into account the signal-to-interference plus noise ratio (SINR) and the characteristics of the UE's receiver. At the user equipment 250, the CQI that is produced by the processor 270 is processed by a TX data processor 238, modulated by a modulator 280, conditioned by the receiver system transceivers 254a through 254r and transmitted back to the base station 210. In addition, a data source 236 at the user equipment 250 can provide additional data to be processed by the TX data processor 238.

The user equipment 250 may be capable of receiving and processing spatially multiplexed signals. Spatial multiplexing may be performed at the base station 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system that receives and processes spatially multiplexed signals, a pre-code matrix is typically used at the base station 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the user equipment 250 to feed back information to the base station 210 about the received signals. For example, both the base station 210 and the user equipment 250 may contain a codebook with a number of precoding matrices. Each of these precoding matrices can, in some instances, be related to an amount of cross-correlation experienced in the received signal. Since it is advantageous to send the index of a particular matrix rather than the values in the matrix, the user equipment 250 may send a CSI report with PMI information to the base station 210. A rank indicator (RI) which indicates to the base station 210 how many independent data streams to use in spatial multiplexing may also transmitted.

Communication system 200 can also utilize transmit diversity schemes instead of the spatially multiplexed scheme described above. In these examples, the same data stream is transmitted across the transmitter system antennas 224a through 224t. The data rate delivered to the user equipment 250 is typically lower than spatially multiplexed MIMO communication systems 200. Transmit diversity schemes can provide robustness and reliability of the communication channel. Each of the signals transmitted from the transmitter system antennas 224a through 224t will experience a different interference environment (e.g., fading, reflection, multi-path phase shifts). The different signal characteristics received at the receiver system antennas 252a through 254r may be useful in determining the appropriate data stream.

Other exemplary systems may utilize a combination of spatial multiplexing and transmit diversity. For example, in a system with four antennas 224, a first data stream may be transmitted on two of the antennas, and a second data stream may be transmitted on the remaining two antennas. In these examples, the rank indicator may be set to an integer lower than the full rank of the precode matrix, indicating to the base station 210 to employ a combination of spatial multiplexing and transmit diversity.

At the base station 210, the modulated signals from the user equipment 250 are received by the transmitter system antennas 224, conditioned by the transceivers 222, demodulated by a demodulator 240, and processed by the RX data processor 242 to extract the reserve link message transmitted by the user equipment 250. Processor 230 at the base station 210 may then determine which pre-coding matrix to use for future forward link transmissions. Processor 230 can also use the received signal to adjust the beamforming weights for future forward link transmissions.

Processor 230 at the base station 210 and the processor 270 at the user equipment 250 may direct operations at their respective systems. Additionally, a memory 232 at the base station 210 and a memory 272 at the user equipment 250 can provide storage for program codes and data used by the transmitter system processor 230 and the receiver system processor 270, respectively. Further, at the user equipment 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

As noted above, a CQI report can be provided to the processor 230 of the base station 210 and used to determine, for example, data rates as well as coding and modulation schemes to be used for one or more data streams in one or more component carriers. The determined coding and modulation schemes can then be provided to one or more transceivers 222a through 222t at the base station 210 for quantization and/or use in later transmissions to the user equipment 250. Additionally and/or alternatively, the reported CQI can be used by the processor 230 of the base station 210 to generate various controls for the TX data processor 214 and the TX MIMO processor 220. In one example, the CQI and/or other information processed by the RX data processor 242 of the base station 210 can be provided to a data sink 244.

As discussed herein, CQI reports for selected carriers or different groups of component carries may be triggered aperiodically by the base station 210 and reported by the user equipment 250 on a physical uplink shared data channel (PUSCH). The groups may be configured semi-statically by, for example, radio resource control (RRC) signaling from the base station 210 to the user equipment 250, and the trigger may be coded to select one of the configured groups in response to changing channel conditions and traffic levels. The type of CQI (e.g., wideband or sub-band) may also be configured by RRC signaling. Additionally, selected component carriers may activated or deactivated by the base station 210, either dynamically or semi-statically, which may suspend or change CQI reporting for the deactivated component carriers.

In the multi-carrier wireless communication system of the present disclosure, user equipment (UE) 250 may be configured with two or more component carriers (CCs) in a carrier aggregation (CA) scheme to provide expanded bandwidth resources on the forward channel (downlink) from the base station (eNodeB) 210 to the UE 250 and/or on the reverse channel (uplink) from the UE 250 to the eNodeB 210. In both the downlink and the uplink, one of the component carriers may be designated as the primary component carrier (PCC), while the other carriers may be designated as secondary component carriers (SCCs).

According to the present disclosure, aperiodic CQI report triggering in a multicarrier system may take different forms. One possible triggering format is a one-to-one mapping where a PDCCH in each downlink component carrier (DL CC) may trigger an aperiodic CQI report in a PUSCH on a corresponding uplink component carrier (UL CC). That is, in any given subframe, user equipment 250 may receive multiple PDCCHs with the triggering bit set, and may therefore transmit multiple PUSCHs with CQI reports. In LTE Rel-10 and beyond, on a per UE basis, both symmetric and DL-heavy asymmetric CC configurations are supported. In the case of a DL-heavy asymmetric CC configuration (i.e., more DL CCs than UL CCs), at least one PDCCH may need to trigger CQI feedback for two or more DL CCs. That is, a one-to-one mapping is not sufficient. In fact, since each PDCCH requires at least one OFDM symbol reservation across the full bandwidth of the component carrier, a one-to-one mapping can result in an inefficient use of resources in a multi-carrier system.

In a one-to-all mapping, one bit in a PDCCH (e.g., the DL PCC) would be used to trigger CQI feedback for all the configured DL CCs on one UL component carrier (e.g., the UL PCC). However, depending on deployment scenarios and traffic/channel conditions, it may not be necessary to report on all configured DL component carriers at once (e.g., where one or more DL component carriers are deactivated as discussed below) and, in addition, one-to-all mapping may cause excessive control overhead in the shared uplink data channel when the CQI reports for all CCs are transmitted on the PUSCH.

Therefore, the techniques described herein provide additional flexibility and increased efficiency for aperiodic CQI reporting in a multi-carrier environment. In one aspect, in a few-to-many mapping, where user equipment 250 is configured with M downlink component carriers as described above, the user equipment 250 may receive additional configuration information via upper layer signaling (e.g., via RRC signaling), defining reporting sets of the configured component carriers.

For example, M configured DL component carriers may comprise a set S (of dimension M) and the upper layer signaling may define one or more reporting sets of the set S (e.g., denoted by $S_1, \ldots, S_N$) for aperiodic CQI triggering such that $S_1 \cup S_2 \cup \ldots \cup S_N = S$ (where $\cup$ is the union operator). The reporting sets $S_n$, n=1, . . . , N, may be disjoint sets (i.e., no common members) or overlapping sets. For example, it may be desirable to include the downlink PCC in every set to insure that a CQI report for the downlink PCC is always triggered, regardless of which reporting set is selected.

The CQI reporting trigger in a PDCCH in a given DL component carrier may be associated with a particular reporting set $S_n$. Downlink control information (DCI) in the PDCCH may be formatted in such a manner (e.g., DCI format 0 or DCI format 4 as defined in LTE Rel-8 and above) that the UE interprets the DCI as an uplink (e.g., PUSCH) transmission grant containing an aperiodic CQI report trigger.

The reporting set of DL component carriers associated with a particular triggering PDCCH may be configured to include the uplink component carrier corresponding to the downlink component carrier that carries the triggering PDCCH. For example, if the triggering PDCCH resides on DL component carrier CC1, for example, then the reporting set of component carriers associated with the CQI reporting trigger in that PDCCH will include CC1 (and possibly other UL component carriers).

As noted above, an RRC configured reporting set $S_n$ may contain one or more deactivated DL CCs, for which the user equipment 250 is not required to report channel feedback (but the CC may still be operational). As a result, when a PDCCH triggers channel feedback for a deactivated DL CC, the UE 250 may either not report channel feedback for the deactivated CC or report dummy channel feedback (e.g., a predetermined data pattern).

There is a potential for ambiguity between the eNodeB 210 and the UE 250 regarding the status of the CC (activated or deactivated), due to the relatively high latency of RRC signaling, so that the eNodeB 210 may need to perform blind detection of uplink control information. In addition, if the CQI feedback for multiple DL CCs is jointly coded in one PUSCH, a misalignment between the eNodeB 210 and the UE 250 with respect to activated/deactivated carriers may cause incorrect reception of channel feedback for all of the involved DL CCs. On the other hand, if the CQI feedback for multiple DL CCs are individually coded and mapped to individual PUSCH resources, reception of channel feedback at the eNodeB can be reduced on a per DL CC basis. Reporting dummy channel feedback using the same layer 3 configured CQI report mode for the corresponding DL CC is more robust, but may unnecessarily waste PUSCH resources.

Figure 3:
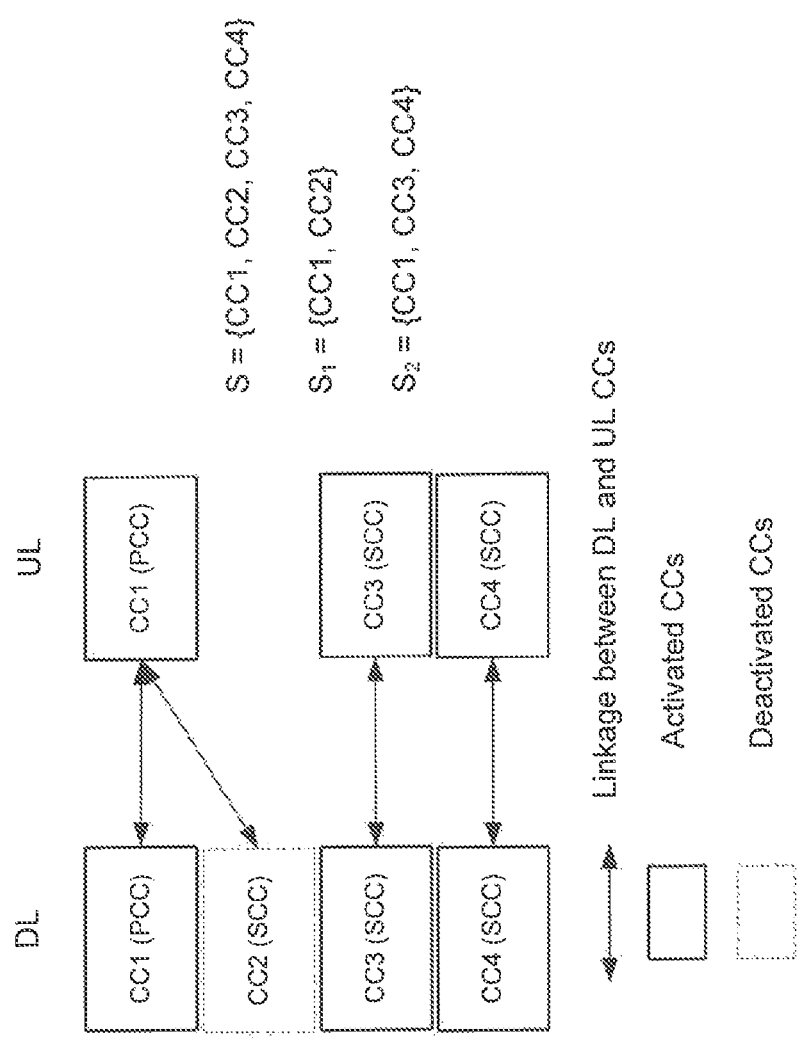
FIG. 3 illustrates aspects of aperiodic CQI triggering and reporting.

FIG. 3 illustrates an example of a few-to-many set-based aperiodic CQI report triggering such as may be used with the multi-carrier communication systems shown in FIGS. 1 and 2. In FIG. 3, the UE 250 of FIG. 2 is configured with 4 DL CCs and 3 UL CCs, where UL-CC$_2$ is deactivated. Two DL CC reporting sets are configured, $S_1$ and $S_2$, where the DL PCC (DL-CC$_1$) is present in both sets. The UE 250 can respond to triggering by the eNodeB 210 such that when PDCCH scheduling of PUSCH on CC$_1$ is detected, it triggers aperiodic CQI feedback for set $S_1$ (DL-CC$_1$ and DL-CC$_2$), and when PDCCH scheduling of PUSCH on CC$_3$ or CC$_4$ is detected, it triggers the UE 250 to report CQI for set $S_2$ (DL-CC1, DL-CC3 and DL-CC4).

DL CC set-based aperiodic CQI report triggering can provide the eNodeB 210 with the flexibility to efficiently operate DL scheduling depending on the deployment scenario and the traffic/channel conditions at the UE 250. Layer 3 (e.g., RRC) based configuration helps the eNodeB 210 balance the tradeoff between efficiency, flexibility and complexity. In the limit, the eNodeB 210 can configure one set, including all DL-CCs, which reduces to one-to-all mapping. The eNodeB 210 can also configure M mutually orthogonal sets, which reduces to one-to-one mapping as described above.

In one aspect, a one-to-many CQI report triggering scheme may be implemented in the communication system where each PDCCH generated by the eNodeB 210 (and associated with a corresponding DL component carrier) may include one or more triggering bits configured to trigger CQI reporting by UE 250 for one of a plurality of DL, component carrier reporting sets (e.g., defined by RRC signaling). In this example, the eNodeB 210 may send only one PDCCH with a CQI trigger in a given subframe.

The triggering bits may be mapped or coded to correspond to different reporting requirements which may be interpreted by UE 250 as no reporting (e.g., a different PDCCH is being used for triggering), reporting only on the DL component carrier on which the triggering PDCCH resides, or selecting one of a plurality of RRC predefined reporting sets, for example. In one aspect, the triggered CQI report may be transmitted on the PUSCH scheduled by the triggering PDCCH irrespective of whether the UL PCC has a PUSCH transmission or not. In another aspect, the triggered CQI report may be transmitted on the uplink PCC regardless of the triggering PDCCH.

As one example, a triggering code sent from the eNodeB 210 might include 3 DCI bits allocated to CQI report triggering in a given PDCCH. It will be appreciated that the general principles involved may be applied using more than three bits or fewer than three bits. The three coded bits might be interpreted by the UE 250 in the following manner. Code '000' may correspond to no CQI reporting, code '001' may trigger CQI reporting only for the DL component carrier which carries the triggering PDCCH, code '010' may trigger CQI reporting for a first set of DL component carriers preconfigured by higher layer signaling, and code '100' may trigger CQI reporting for a second set of DL component carriers preconfigured by higher layer signaling. It will be appreciated that the same result could be achieved using 2-bit binary signaling where, for example, binary code 00 corresponds to 3-bit code 000, binary code 01 corresponds to 3-bit code 001, binary code 10 corresponds to 3-bit code 010 and binary code 11 corresponds to 3-bit code 100.

In the example described above, it is the responsibility of the eNodeB 210 to pick a unique component carrier PUSCH in each subframe on which to transmit the CQI feedback for each reporting set. It will be appreciated that when such a PUSCH is dynamically scheduled via the triggering PDCCH, the eNodeB can control the MCS properly to ensure the quality of the channel feedback.

Transmitting the CQI report on the PUSCH corresponding to the triggering PDCCH can avoid potential confusion between the eNodeB 210 and the UE 250 in a situation where the PDCCH for the UL. PCC may be missed (e.g., if the PUSCH on the UL PCC is dynamically scheduled) and the corresponding DL PCC may not be part of the DL CC reporting set in question. In addition, if the PUSCH on the UL PCC undergoes non-adaptive re-transmission, its MCS, transmit power, available resource elements, etc. may not be in the appropriate combination to carry CQI feedback with the desired quality. It will be appreciated that, typically, each PDCCH is targeted with a 1% miss-detection probability. Therefore, enabling triggering over two or more PDCCHs for the same DL CC triggering set may not be necessary from a performance perspective.

Accordingly, the triggering of two or more DL CC reporting sets at the same time may be treated by the UE 250 as an error event (e.g., an eNodeB coding error or a decoding error at the UE). Alternatively, the UE may proceed with CQI reporting for all the (apparently) triggered reporting sets on the corresponding PUSCHs because the eNodeB will know which component carrier PUSCH it wanted to carry the CQI feedback. Another alternative is to report only one of the triggered sets of channel information feedback on the corresponding PUSCH, where the set to report can be preconfigured. Yet another alternative is to report the union of the triggered sets of channel information feedback on only one PUSCH, where the PUSCH for the report can be the PCC (if PUSCH on PCC exists), or on a pre-determined CC (e.g., the PUSCH on the component carrier with the minimum carrier frequency, or, the PUSCH on the component carrier with the lowest order in RRC configuration, etc.).

The association of a downlink component carrier PDSCH and an uplink component carrier PUSCH can be by UE 250 based on a broadcast message from eNodeB 210 (e.g., as part of a system information block (SIB) message in LTE). That is, eNodeB 210 can send the identification or selection of the associated UL CC and DL CC in a broadcast message.

Alternatively, a DL. CC and an UL CC may be associated via a cross-carrier indicator field (CIF) in the PDCCH that controls cross-carrier signaling. Another example is to associate a DL CC and an UL CC via a path loss measurement (e.g., by selecting the most robust uplink and downlink channels or by matching the respective path losses). The association can be made on a per cell basis or on a per UE basis.

Figure 4:
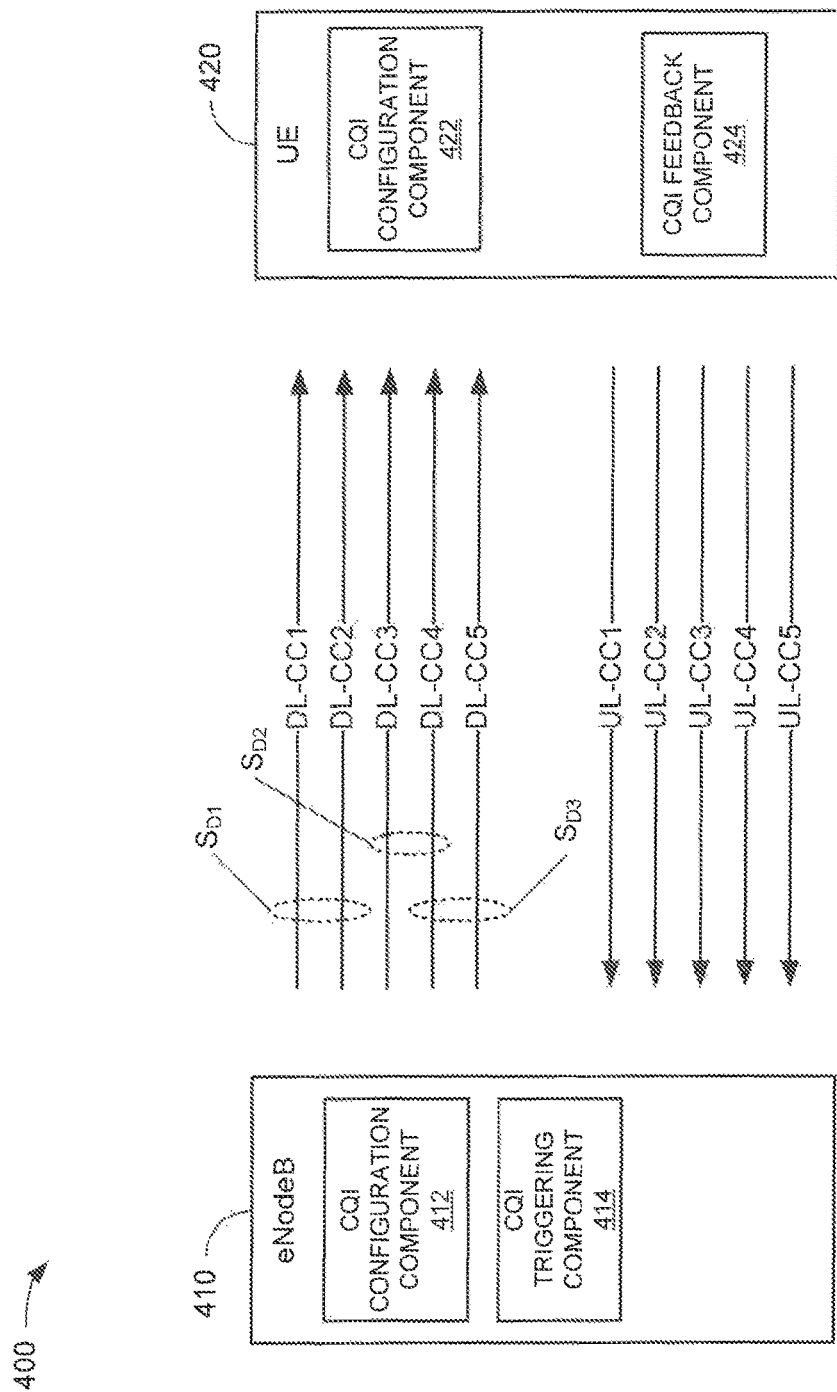
FIG. 4 illustrates further aspects of aperiodic CQI triggering and reporting.

FIG. 4 illustrates an exemplary system 400 capable of implementing aspects of the systems and equipment described in relation to the preceding figures. System 400 includes an eNodeB 410 and a UE 420. The eNodeB 410 may include a CQI configuration component 412 that can configure a plurality of downlink component carriers (such as downlink component carriers $DL\text{-}CC_1$ through DL-CCs) for a UE 420 as one or more reporting sets of component carriers such as $S_{D1}$ (comprising DL component carriers CC1 and CC2), $S_{D2}$ (comprising DL component carriers CC3 and CC4) and $S_{D2}$ (comprising DL component carriers CC4 and CC5). The UE 420 may receive the configuration of the reporting sets via upper layer signaling as described above. In general, the sets may be disjoint sets or overlapping sets. The CQI configuration component in the eNodeB 410 may also signal the activation/deactivation of selected component carriers in the reporting sets. Each DL CC may include a PDCCH in a given subframe, but only one PDCCH among the configured DL CCs may trigger CQI reporting in the given subframe.

As described above, the triggering PDCCH may trigger a single carrier CQI report or one of a plurality of reporting sets depending on the state of the triggering bits. In the case of the four state reporting described above (e.g., using 3-bit mapping or 2-bit binary coding), for example, if the PDCCH on DL-CC1 is the triggering PDCCH, then the CQI report might consist of a report on DL-CC1 only, a report on reporting set SD1 and a report on one other reporting set (e.g., SD2 or SD3). If the PDCCH on DL-CC3 is the triggering PDCCH, then the CQI report might consist of a report on DL-CC3 only, a report on reporting set SD2 and a report on one other reporting set (e.g., SD1 or SD3).

It will be appreciated that, in general, any DL CC can transmit the triggering (i.e., active) PDCCH and that the response to any particular triggering bit state can be pre-configured by upper layer signaling. Accordingly, the UE 420 may also include a CQI configuration component 422 to store the reporting set configuration information and a CQI feedback component 424, configured to report CQI in response to the triggering PDCCH.

In general, the UE 420 responds to PDCCH triggering on one of the DL CCs with a CQI report for the DL-CC reporting set identified by the one or more triggering bits in the triggering PDCCH, using the PUSCH scheduled by the triggering PDCCH (or a default PUSCH such as the UL PCC PUSCH). The CQI feedback includes CQI for all DL-CCs in the reporting set selected by the CQI trigger, unless one or more of the DL-CCs in the reporting set is deactivated, in which case the UE may exercise one of the options described above (e.g., CQI report, no CQI report or dummy CQI report) based on, for example, upper layer configuration information received from the eNodeB. Although not shown, any number of eNodeBs similar to eNodeB 410 can be included in system 400 and/or any number of UEs similar to UE 420 can be included in system 400.

Figure 5A:
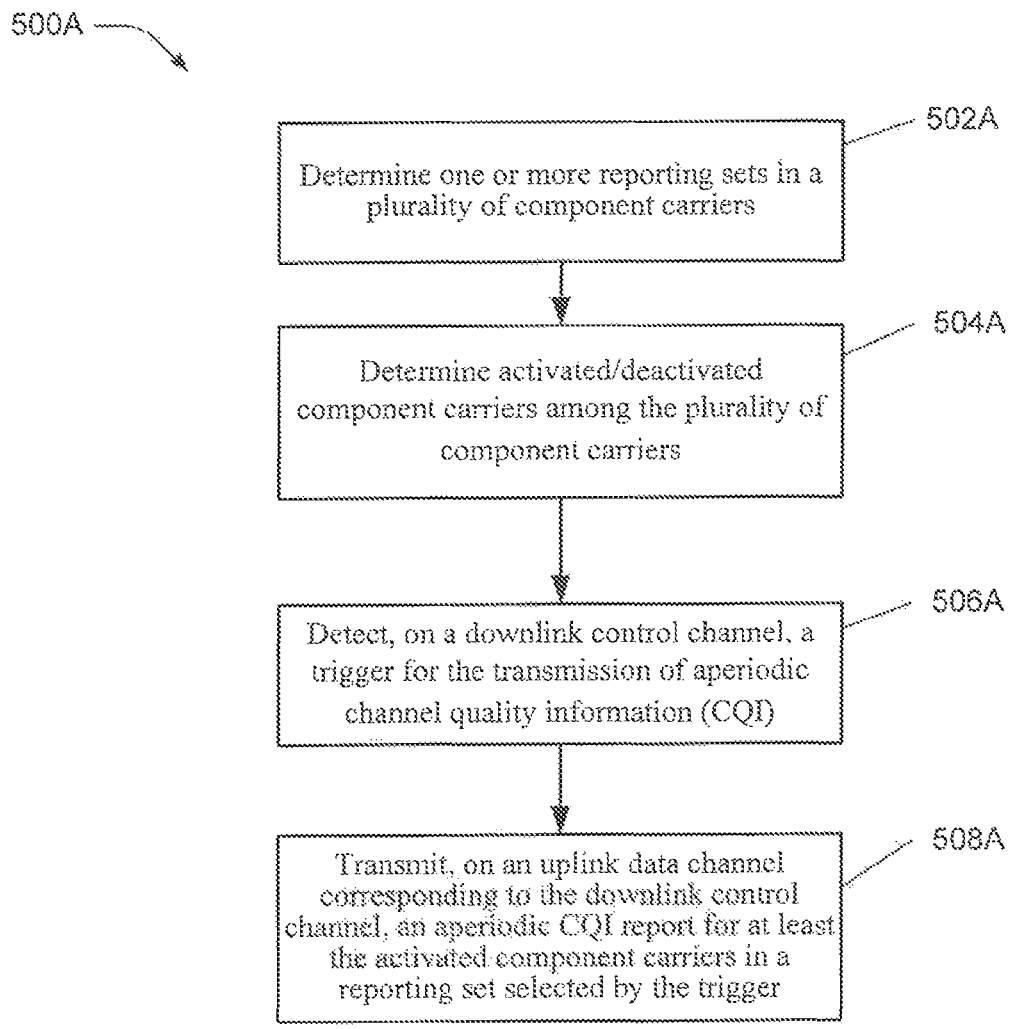
FIG. 5A is a flowchart illustrating an exemplary process of transmitting an aperiodic CQI report.

FIG. 5A is a flowchart illustrating an exemplary method 500A in a user equipment such as UE 420. The method begins at operation 502A where the UE determines one or more reporting sets, where each set includes a plurality of component carriers. The configuration of reporting sets may be received in one or more RRC messages and may change as CCs configured for the UE change and/or their activation status changes. The method may also include an operation 504A, where the UE determines activated/deactivated components carriers among the one or more reporting sets. The configuration of activated/deactivated component carriers may be received in one or more RRC messages and may change as CCs configured for the UE change. The method continues at operation 506A where the UE detects a trigger for the transmission of aperiodic channel quality information (CQI) on a downlink control channel. The method concludes at operation 508A where the UE transmits an aperiodic CQI report, on an uplink data channel corresponding to the downlink control channel, for at least the activated component carriers in the reporting set selected by the trigger.

Figure 5B:
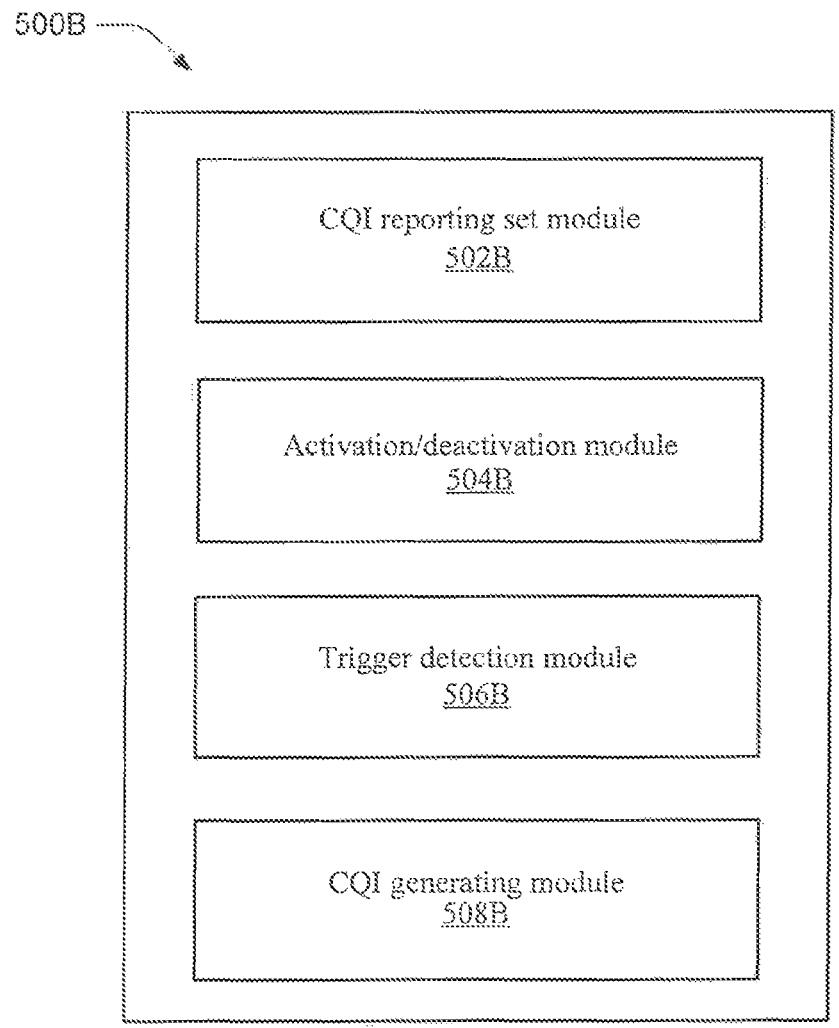
FIG. 5B illustrates an exemplary apparatus which may perform the process of FIG. 5A.

FIG. 5B illustrates an exemplary apparatus 500B such as may perform the method 500A. The apparatus 500B may be as described in connection with elements UE 116 in FIG. 1, UE 250 in FIG. 2 and UE 420 in FIG. 4. As shown, the apparatus 500B may include a CQI reporting set module 502B for determining one or more reporting sets of a plurality of component carriers based on RRC signaling received from an eNobeB such as the elements 102, 210 and 410 in FIGS. 1, 2 and 4, respectively. The apparatus 500B may also include an activation/deactivation module 504B for determining the activation/deactivation status of the plurality of component carriers. The apparatus 500B may also include a trigger detection module 506B for detecting a trigger for the transmission of aperiodic channel quality information on a downlink control channel. An apparatus 500B may also include a CQI transmission module 508B for transmitting an aperiodic CQI report, on an uplink data channel corresponding to the downlink control channel, for at least the activated component carriers in a reporting set selected by the trigger.

Figure 6A:
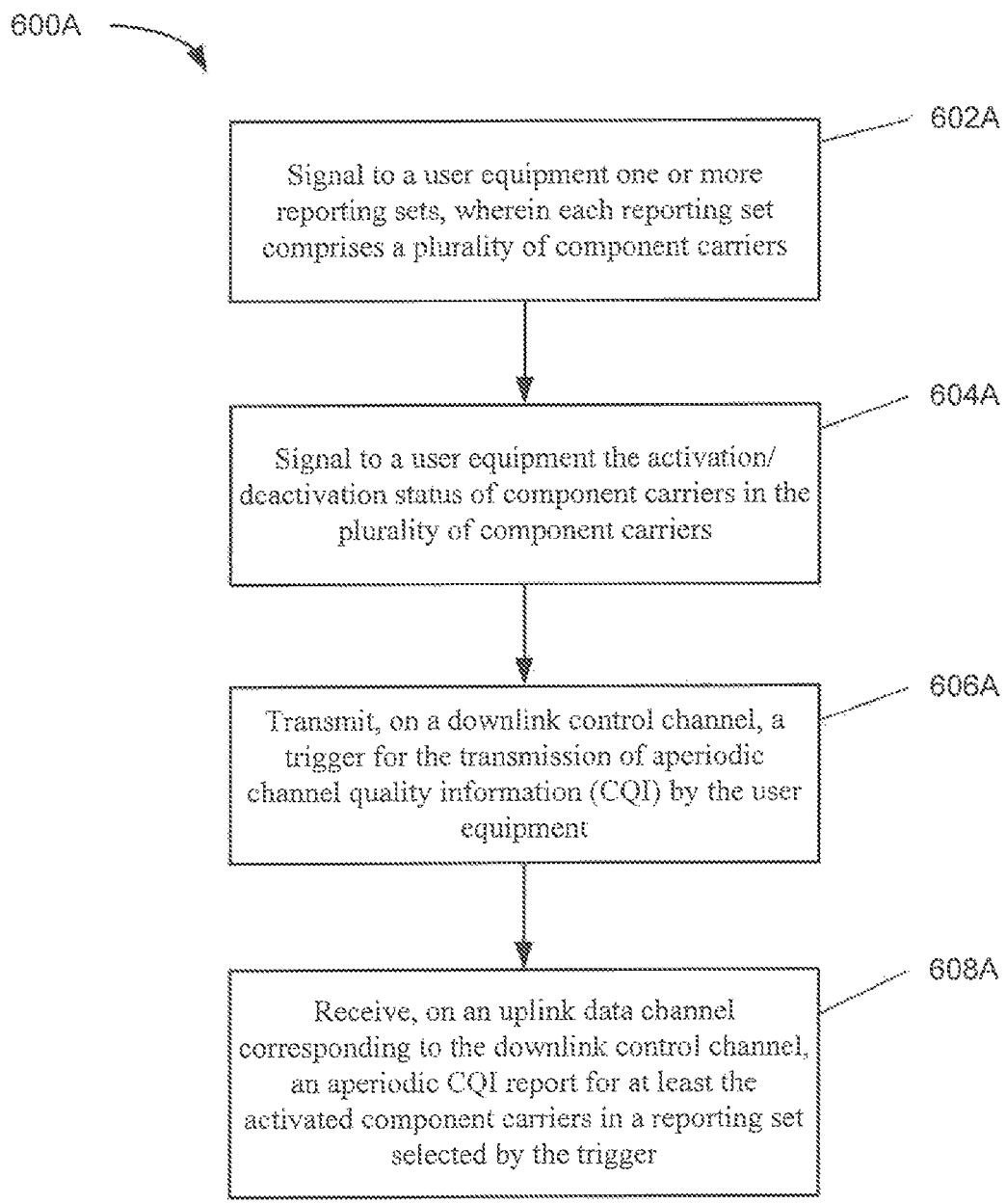
FIG. 6A is a flowchart illustrating an exemplary process of triggering an aperiodic CQI report.

FIG. 6A is a flowchart illustrating an exemplary method 600A in a base station such as base station 102 in FIG. 1, base station 210 in FIG. 2 and eNodeB 410 in FIG. 4. Method 600A begins at operation 602A where the base station signals to a UE (such as UE 116, UE 250 or UE 420) one or more reporting sets in a plurality of component carriers. The method continues at operation 604A where the base station signals to the UE the activation/deactivation status of component carriers in the plurality of component carriers. The signaling in operations 602A and 602B may be sent in one or more RRC messages to the UE and may change as CCs configured for the UE change or their activation status changes. The method continues at operation 606A, where the base station transmits, on a downlink control channel, a trigger for the transmission of aperiodic channel quality information (CQI) by the UE. The method concludes at operation 608A, where the base station receives, on an uplink data channel corresponding to the downlink control channel, an aperiodic CQI report for at least the activated component carriers in a reporting set selected by the trigger.

Figure 6B:
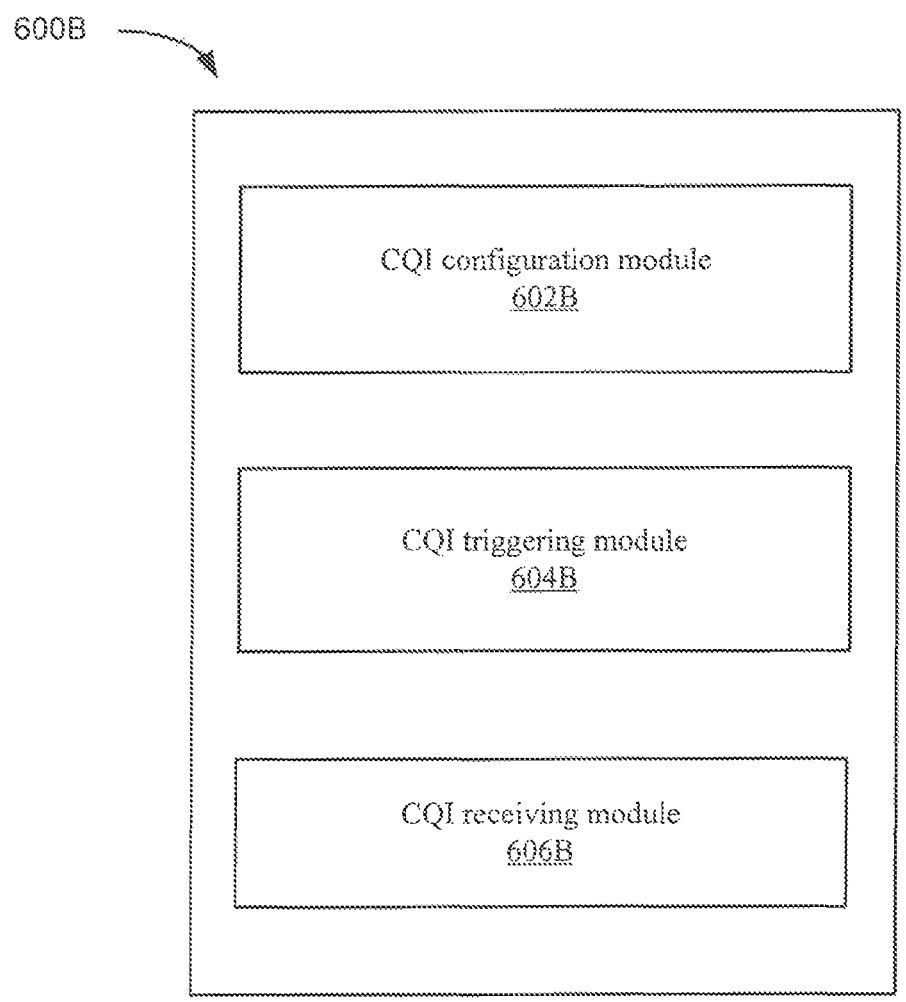
FIG. 6B illustrates an exemplary apparatus which may perform the process of FIG. 6A.

FIG. 6B illustrates an apparatus 600B capable of performing the method 600A. Apparatus 600B may be as described in connection with elements 102, 210, and 410 in FIGS. 1, 2, and 4, respectively. As shown, the apparatus 600B includes a CQI configuration module 602B for signaling a configuration for one or more reporting sets of a plurality of component carriers and for signaling the activation/deactivation status of each of the component carriers. Apparatus 600B also includes a CQI triggering module 604R for transmitting, on a downlink control channel, a trigger for the transmission of aperiodic channel quality information (CQI). And apparatus 600B also includes a CQI receiving module 606B for receiving, on an uplink data channel corresponding to the downlink control channel, an aperiodic CQI report for activated component carriers in a reporting set selected by the trigger.

For purposes of illustration, the methods above are shown and described as a series of operations. It is to be understood that the methods are not limited by the order of operations, as some operations can, in accordance with one or more embodiments, occur in different orders and/or concurrently with other operations from that shown and described herein. For example, those skilled in the art will understand and appreciate that a method could alternatively be represented as a series of interrelated states or events, such as in a state diagram. Moreover, not all illustrated operations may be required to implement a method in accordance with one or more of the disclosed embodiment.

Figure 7:
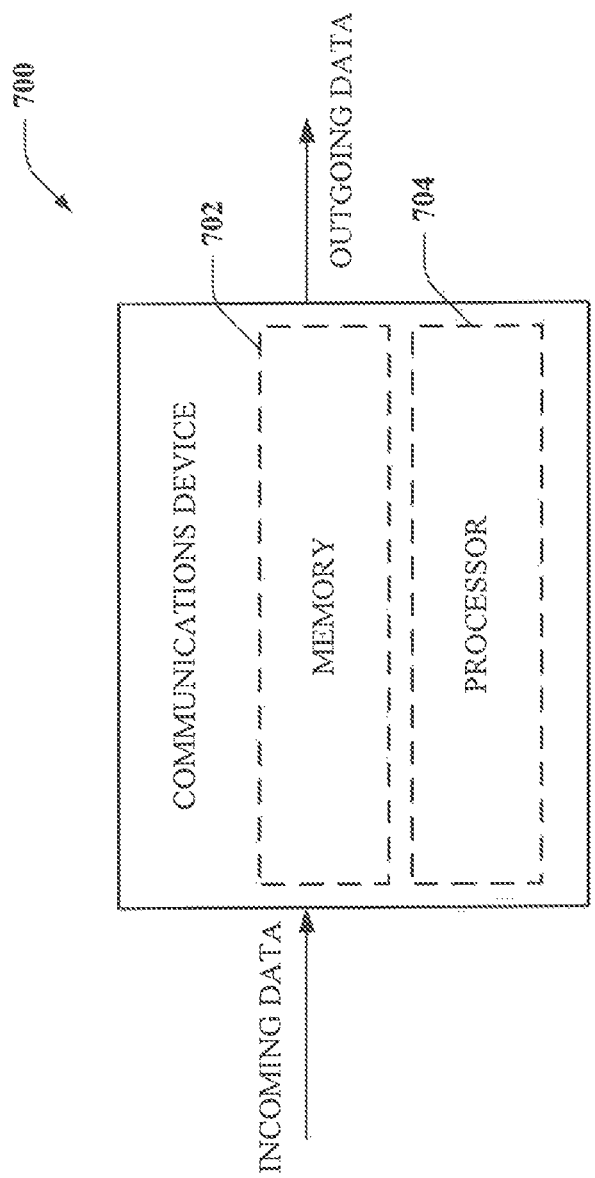
FIG. 7 illustrates another apparatus in which aspects of the present disclosure may be implemented.

FIG. 7 illustrates an apparatus 700 within which the various disclosed embodiments may be implemented. In particular, the apparatus 700 that is shown in FIG. 7 may comprise at least a portion of an eNodeB (such as the eNodeB 210 depicted in FIG. 2 or the eNodeB 410 depicted in FIG. 7) or at least a portion of a UE (such as the UE 250 depicted in FIG. 2 or the UE 420 depicted in FIG. 7) The apparatus 700 that is depicted in FIG. 7 can be resident within a wireless network and receive incoming data via, for example, one or more receivers and/or the appropriate reception and decoding circuitry (e.g., antennas, transceivers, demodulators and the like). The apparatus 700 that is depicted in FIG. 7 can also transmit outgoing data via, for example, one or more transmitters and/or the appropriate encoding and transmission circuitry (e.g., antennas, transceivers, modulators and the like). Additionally, or alternatively, the apparatus 700 that is depicted in FIG. 7 may be resident within a wired network.

FIG. 7 further illustrates that the apparatus 700 can include a memory 702 that can retain instructions for performing one or more operations, such as signal conditioning, analysis and the like. Additionally, the apparatus 700 of FIG. 7 may include a processor 704 that can execute instructions that are stored in the memory 702 and/or instructions that are received from another device. The instructions can relate to, for example, configuring or operating the apparatus 700 or a related communications apparatus. It should be noted that while the memory 702 that is depicted in FIG. 7 is shown as a single block, it may comprise two or more separate memories that constitute separate physical and/or logical units. In addition, the memory while being communicatively connected to the processor 704, may reside fully or partially outside of the apparatus 700 that is depicted in FIG. 7. It is also to be understood that one or more components, such as the configuration component 412, the triggering component 414 and the CQI feedback component 422 that are shown in FIG. 7, can exist within a memory such as memory 702.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 700 of FIG. 7 can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, or twisted pair, then the coaxial cable, fiber optic cable, or twisted pair are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved IUTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 420 in FIG. 4). In the alternative, the processor and the storage medium may reside as discrete components in a user equipment (e.g., 422 in FIG. 4). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method in a user equipment, comprising:
   receiving, in a radio resource control (RRC) message, an indication of one or more reporting sets corresponding to a plurality of component carriers;
   receiving, on a downlink control channel, a trigger for the transmission of aperiodic channel quality information (CQI), wherein the trigger comprises two or more triggering bits of a downlink control channel message that form a code corresponding to a reporting set in the one or more reporting sets;
   selecting, based on the trigger, a reporting set from the one or more reporting sets corresponding to the plurality of component carriers; and
   sending, on an uplink data channel, an aperiodic CQI report for component carriers in the selected reporting set.

2. The method of claim 1, wherein a number of the two or more triggering bits is smaller than a number of component carriers in the plurality of component carriers.

3. The method of claim 1, wherein a first value of the trigger corresponds to CQI reporting on a component carrier corresponding to the downlink control channel.

4. The method of claim 3, wherein a second value of the trigger corresponds to CQI reporting on multiple component carriers of a first reporting set.

5. The method of claim 1, wherein the two or more triggering bits comprise two triggering bits.

6. The method of claim 1, wherein reporting the aperiodic CQI comprises:
   determining activated component carriers among the component carriers; and
   generating CQI information for each activated component carrier in the selected reporting set.

7. The method of claim 6, further comprising:
   determining deactivated component carriers among the component carriers; and
   generating dummy feedback for the CQI information for each deactivated component carrier in the selected reporting set.

8. The method of claim 1, wherein the downlink control channel schedules transmissions on the uplink data channel.

9. The method of claim 1, wherein sending the aperiodic CQI report on the uplink data channel comprises multiplexing the aperiodic CQI with data transmissions on a primary uplink component carrier.

10. The method of claim 1, further comprising jointly coding CQI feedback for the component carriers in the selected reporting set.

11. The method of claim 1, further comprising separately coding CQI feedback for the component carriers in the selected reporting set.

12. The method of claim 1, further comprising:
   detecting a number of triggers for reporting the aperiodic CQI received in a subframe; and
   determining an error condition at the user equipment when the number of triggers received in the subframe is greater than one.

13. An apparatus configured for wireless communication, the apparatus comprising:
   at least one processor; and
   a memory coupled to the at least one processor,
   wherein the at least one processor is configured to:
      receive, in a radio resource control (RRC) message, an indication of one or more reporting sets corresponding to a plurality of component carriers;
      receive, on a downlink control channel, a trigger for the transmission of aperiodic channel quality information (CQI), wherein the trigger comprises two or more triggering bits of a downlink control channel message that form a code corresponding to a reporting set in the one or more reporting sets;
      select, based on the trigger, a reporting set from the one or more reporting sets corresponding to the plurality of component carriers; and
      output, to an uplink data channel, an aperiodic CQI report for component carriers in the selected reporting set.

14. The apparatus of claim 13, wherein a number of the two or more triggering bits is smaller than a number of possible reporting options corresponding to the plurality of component carriers.

15. The apparatus of claim 13, wherein a first value of the trigger corresponds to CQI reporting on a component carrier corresponding to the downlink control channel.

16. The apparatus of claim 15, wherein a second value of the trigger corresponds to CQI reporting on multiple component carriers of a first reporting set.

17. The apparatus of claim 13, wherein each of the reporting sets includes a primary component carrier (PCC), and wherein the downlink control channel is received on the PCC.

18. The apparatus of claim 13, wherein at least two of the one or more reporting sets comprise overlapping sets.

19. The apparatus of claim 13, wherein at least two of the one or more reporting sets comprise non-overlapping sets.

20. The apparatus of claim 13, wherein the one or more reporting sets comprise a complete set of component carriers.

21. An apparatus configured for wireless communication, the apparatus comprising:
   means for receiving, in a radio resource control (RRC) message, an indication of one or more reporting sets corresponding to a plurality of component carriers;

means for receiving, on a downlink control channel, a trigger for the transmission of aperiodic channel quality information (CQI), wherein the trigger comprises two or more triggering bits of a downlink control channel message that form a code corresponding to a reporting set in the one or more reporting sets;

means for selecting, based on the trigger, a reporting set from the one or more reporting sets corresponding to the plurality of component carriers; and means for sending, on an uplink data channel, an aperiodic CQI report for component carriers in the selected reporting set.

22. The apparatus of claim 21, wherein a number of the two or more triggering bits is smaller than a number of component carriers in the plurality of component carriers.

23. The apparatus of claim 21, wherein a first value of the trigger corresponds to CQI reporting on a component carrier corresponding to the downlink control channel.

24. The apparatus of claim 23, wherein a second value of the trigger corresponds to CQI reporting on multiple component carriers of a first reporting set.

25. The apparatus of claim 21, wherein the two or more triggering bits comprise two triggering bits.

26. A non-transitory, computer-readable medium storing instructions that, when executed by a processor, cause the processor to perform operations comprising:

receiving, in a radio resource control (RRC) message, an indication of one or more reporting sets corresponding to a plurality of component carriers;

receiving, on a downlink control channel, a trigger for the transmission of aperiodic channel quality information (CQI), wherein the trigger comprises two or more triggering bits of a downlink control channel message that form a code corresponding to a reporting set in the one or more reporting sets;

selecting, based on the trigger, a reporting set from the one or more reporting sets corresponding to the plurality of component carriers; and sending, on an uplink data channel, an aperiodic CQI report for component carriers in the selected reporting set.

27. The non-transitory, computer-readable medium of claim 26, wherein a number of the two or more triggering bits is smaller than a number of possible reporting options corresponding to the plurality of component carriers.

28. The non-transitory, computer-readable medium of claim 26, wherein a first value of the trigger corresponds to CQI reporting on a component carrier corresponding to the downlink control channel.

29. The non-transitory, computer-readable medium of claim 28, wherein a second value of the trigger corresponds to CQI reporting on multiple component carriers of a first reporting set.

30. The non-transitory, computer-readable medium of claim 26, wherein the two or more triggering bits comprise two triggering bits.

* * * * *